United States Patent [19]

Jacobson

[11] Patent Number: 5,657,480
[45] Date of Patent: Aug. 12, 1997

[54] METHOD OF RECORDING, PLAYBACK, AND RE-EXECUTION OF CONCURRENTLY RUNNING APPLICATION PROGRAM OPERATIONAL COMMANDS USING GLOBAL TIME STAMPS

[75] Inventor: Neal F. Jacobson, Nashua, N.H.

[73] Assignee: Digital Equipment Corporation, Maynard, Mass.

[21] Appl. No.: 442,309

[22] Filed: May 16, 1995

Related U.S. Application Data

[62] Division of Ser. No. 126,428, Sep. 24, 1993, Pat. No. 5,448,739, which is a division of Ser. No. 368,746, Jun. 19, 1989, abandoned.

[51] Int. Cl.$^6$ ........................................ G06F 11/34
[52] U.S. Cl. .......................... 395/555; 395/500; 395/701
[58] Field of Search ...................... 395/550, 700, 395/500

[56] References Cited

U.S. PATENT DOCUMENTS 5,022,028  6/1991  Edmonds et al. .................. 371/25.1
5,461,700  10/1995  Kimura et al. .................... 395/80

OTHER PUBLICATIONS

"Lotus 1-2-3 User's Manual, Chapter 6 Automating with Macros," Copyright 1983, 1988, Lotus Development Corporation, 55 Cambridge Parkway, Cambridge, MA 02142, pp. 6-1 to 6-23.
Simrin, S., "MS-DOS* Bible," 1987, Howard W. Sams & Co., pp. 69-85.
Handbuch, "Arbeiten mit Microsoft Word," Version 4, 1987, Microsoft Corporation.

Primary Examiner—Ken S. Kim
Attorney, Agent, or Firm—Denis G. Maloney; Arthur W. Fisher

[57] ABSTRACT

An operator of a digital computer system issues a series of operational commands to respective concurrently executing application programs. Each application program includes a client executive routine that records the application program's operational commands and an associated time stamp indicating when the operational command was received from the operator. The operational commands and the time stamps are transferred to a core executive program that records a script of the operational commands. The core executive determines from the time stamps a global sequence in which the operator issued the operational commands to the application programs. In a playback mode, the computer system re-executes the application programs by issuing the operational commands from the script memory to the application programs in the determined global sequence. In a preferred embodiment, the core executive determines a sequence identifier for each operational command. During the playback mode, the core executive transmits to a command cache for each application program the respective sequence numbers and operational commands having been issued to the application program, and each client executive consecutively issues the operational commands in its application program's command cache until the sequence identifiers indicate that a next operational command in the global sequence is found in the command cache for another application program, at which time the client executive sends a synchronization message to the client executive of the other application program.

6 Claims, 16 Drawing Sheets

SCRIPT STRUCTURE

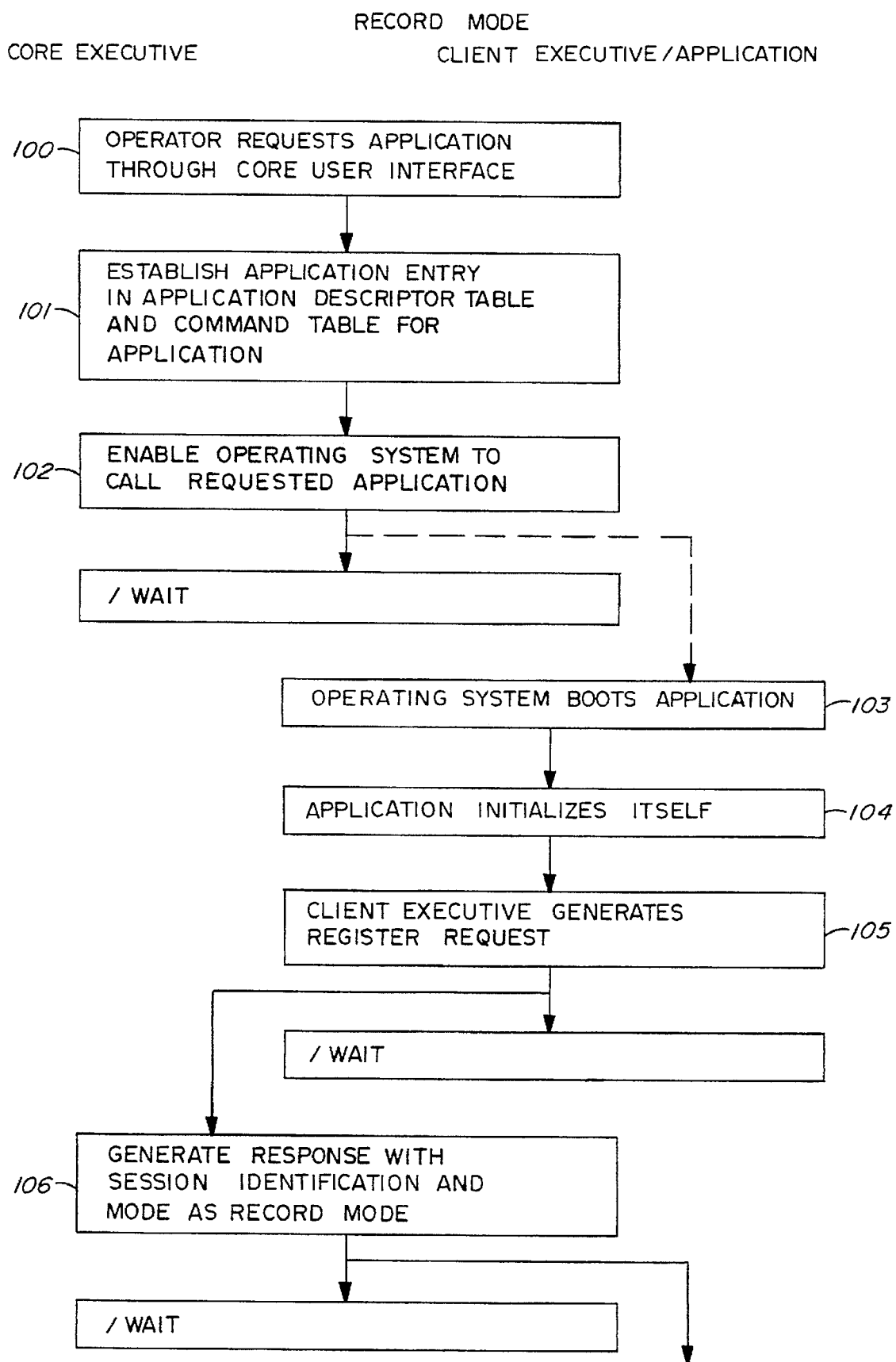

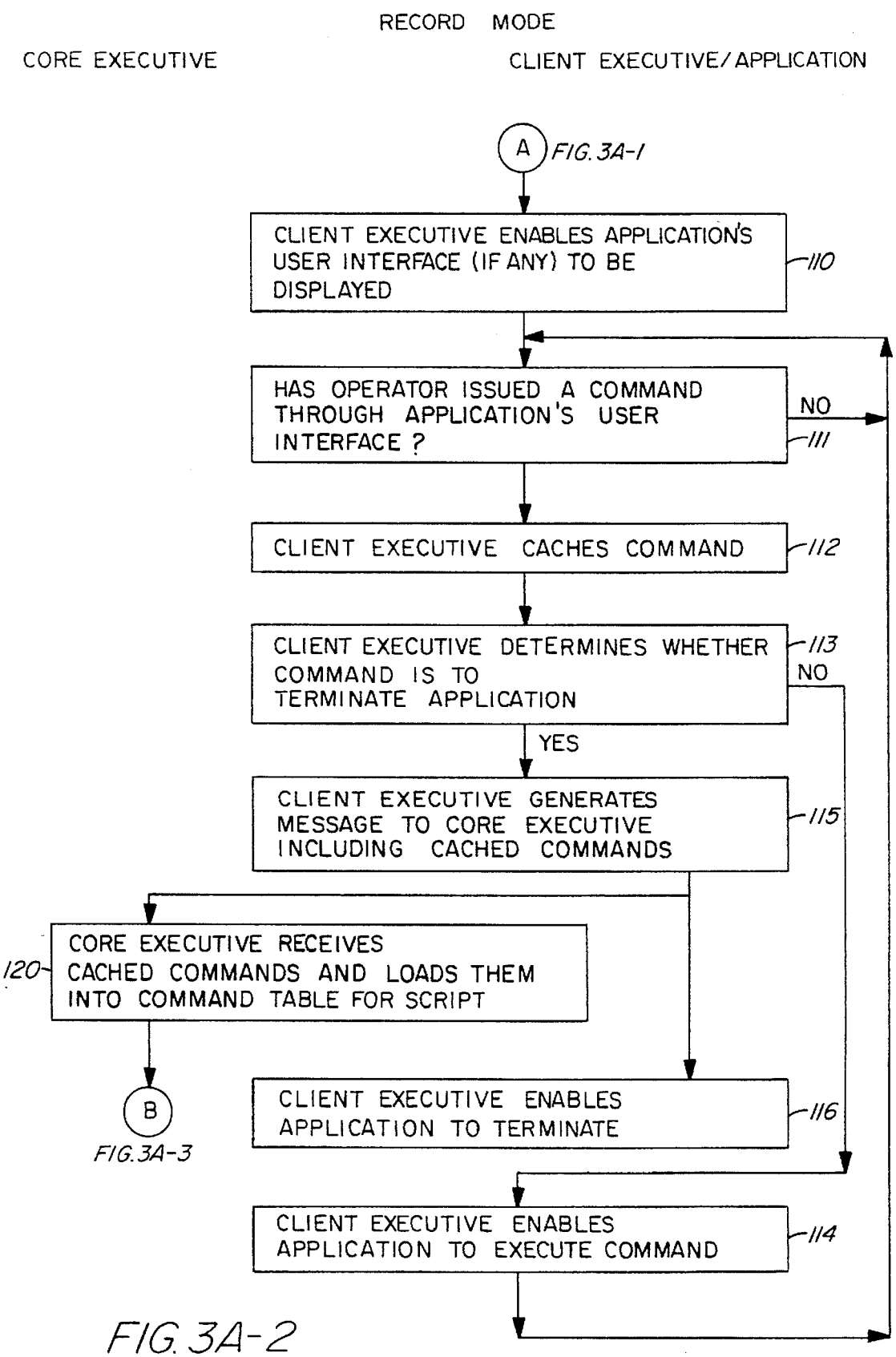

METHOD OF RECORDING, PLAYBACK, AND RE-EXECUTION OF CONCURRENTLY RUNNING APPLICATION PROGRAM OPERATIONAL COMMANDS USING GLOBAL TIME STAMPS

This application is a divisional of application Ser. No. 08/126,428, filed Sep. 24, 1993, now issued as U.S. Pat. No. 5,448,739, which is a divisional of application Ser. No. 07/368,746 filed Jun. 19, 1989, abandoned.

FIELD OF THE INVENTION

The invention relates generally to the field of digital computer systems and more particularly provides a method and system for facilitating integration of a plurality of diverse applications programs for execution in a single processing session.

BACKGROUND OF THE INVENTION

A digital computer system executes programs, each comprising a plurality of sequentially-processed instructions which indicate how information, including commands and data, are to be processed. During execution of a program, the computer system generally processes data which is provided by a number of sources, which may be identified as objects, such as disk files in which previously-acquired data is stored in the computer system, and also externally-provided data which may be obtained from remote sources over, for example, networks and telecommunications lines, as well as from the operator.

In executing a program, the computer system may also use commands received from an operator through, for example, a video display terminal to control execution at particular points in execution of the program. A command enables the computer system to sequence to a particular portion of the program instructions, enabling the computer to perform selected operations at that point. The program is thus interactive, that is, the operator can control execution of the program while the program is in execution. For a number of programs, command syntax can be quite involved, including a number of parameters and arguments. To simplify entry of commands and particularly command sequences which an operator may use often, many programs provide a "macro" facility, which enables the operator, while executing a program, to record commands and command sequences and associate each command or sequence with a series of characters or keystrokes, termed a "macro," which may be easily entered. When the operator enters a series of characters or keystrokes, the computer system, enabled by the program, determines whether they correspond to a previously-entered macro, and if so, it executes the commands associated with the macro.

During a particular processing session, an operator may need to use a plurality of programs sequentially to perform a particular processing operation. To accomplish this, the operator typically calls and uses each program until finished, exiting each program before calling another program. This process may proceed through a number of programs until the processing operation has been completed. Typically, programs have diverse calling syntaxes, that is, arguments and parameters that are used in calling the programs, as well as diverse command syntaxes, and so the process of calling the programs, as well as entering the commands therefor, during a session can often be quite laborious and prone to error.

SUMMARY OF THE INVENTION

The invention provides a new and improved system for use in connection with a digital data processing system for facilitating the integration of a plurality of diverse applications into an integrated application.

In brief summary, in one aspect the invention provides an application integration system for use in a digital computer system. The application integration system comprises a command store and an executive, which includes a command recording portion and a command playback portion. The command recording portion is responsive, during a recording phase, to entry of application call commands from an operator each enabling the digital computer system to process an application, and, while each application is being processed, to receive from the application operational commands, for storing the commands in the command store. The command playback portion enables the digital computer system to process the applications identified in the application call commands stored in the command store during a playback phase, and transmits, while each application is being processed, the operational commands therefor to the application for processing.

In another aspect, the invention provides a method of operating an application integration system in a digital computer system. During a recording phase, the method provides for recording application call commands from an operator cinch enabling the digital computer system to process an application, and, while each application is being processed, application operational commands. During a playback phase, the method provides for iteratively enabling the digital computer system to process the applications identified in the application call commands stored during the recording phase, and for enabling the digital computer system to transmit, while each application is being processed, the operational commands therefor for processing by the application.

In yet another aspect, the invention provides an application integration program for use in a digital computer system comprising a recording enabling module and a playback enabling module. The recording enabling module enables the digital computer system to record, during a recording phase, application call commands from an operator each enabling the digital computer system to process an application, and, while each application is being processed, application operational commands. The playback enabling module enables the digital computer system to iteratively enable, during a playback phase, the digital computer system to process the applications identified in the application call commands stored during the recording phase, and use, while each application is being processed, the operational commands therefor in processing in response to the application.

In still another aspect, the invention provides a digital computer system for concurrently executing application programs, and for playing back the execution of the application programs. An operator of the digital computer system issues a series of operational commands to respective ones of the concurrently executing application programs. Each application program includes a client executive routine that records the application program's operational commands and an associated time stamp indicating when the operational command was received from the operator. The operational commands and the time stamps are transferred to a core executive program that records a script of the operational commands. The core executive determines from the time stamps a global sequence in which the operator issued the operational commands to the application programs. In a playback mode, the computer system re-executes the application programs by issuing the operational commands from the script memory to the application programs in the determined global sequence. In a preferred embodiment, the core executive inspects the time stamps to determine a sequence identifier for each operational command. During the playback mode, the core executive transmits to a command cache for each application program the respective sequence numbers and operational commands having been issued to the application program, and each client executive consecutively issues to its application program the operational commands in the application program's command cache until the sequence identifiers indicate that a next operational command in the global sequence is found in the command cache for another application program, at which time the client executive sends a synchronization message to the client executive of the other application program. When the client executive of the other application program receives the synchronization message, it begins or resumes consecutive issuance of the operational commands in the other application program's command cache.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

FIGS. 3A-1, 3A-2, and 3A-3 together comprise a flowchart of the operation of the present invention during a recording phase in which application call commands and application operational commands are recorded in the script memory of FIG. 1B;

FIGS. 3B-1, 3B-2, 3B-3, and 3B-4 together comprise a flowchart of the operation of the present invention during a playback phase in which the application call commands stored in the script memory are recalled to re-execute application programs under the control of the application operational commands;

FIGS. 3C-1, 3C-2, and 3C-3 together comprise a flowchart of the operation of the present invention during single-step playback and splice modes;

DETAILED DESCRIPTION OF AN ILLUSTRATIVE EMBODIMENT

Figure 1A:
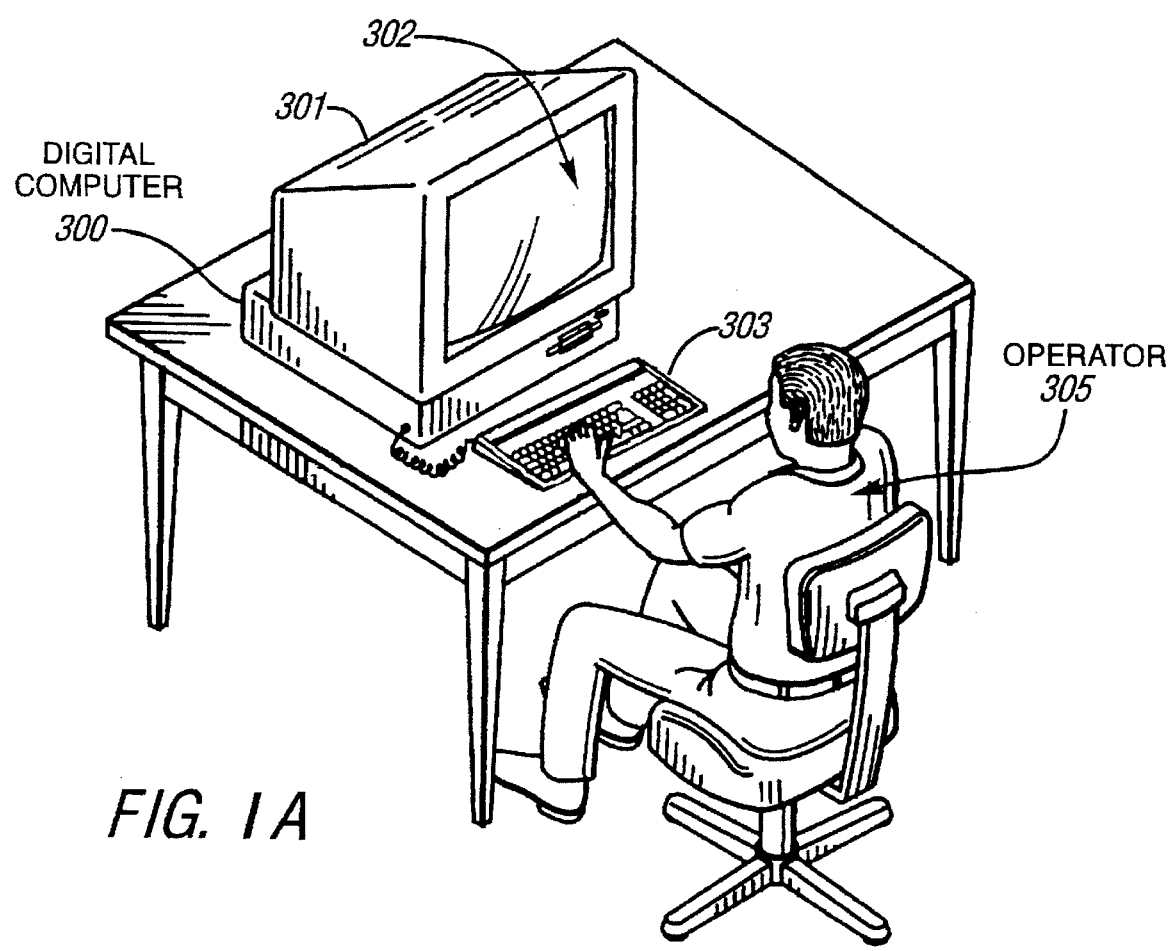
FIG. 1A is a perspective view of an operator and a conventional digital computer that may use the method of the present invention.

Turning now to FIG. 1A of the drawings, there is shown a conventional digital computer 300 that may use the method of the present invention. The digital computer 300 has a conventional video display 301 for displaying information to an operator 305, and a conventional keyboard 303 for receiving commands from the operator. As will be further described below with reference to FIGS. 3A-1 to 2A-3, the commands from the operator may include application call commands, which call specified application programs, and application operational commands, which control the execution of an application program. The video display 301 includes a display screen 302 upon which "windows" of information are displayed, as will be further described below with respect to the "core display window" 15 shown in FIG. 1B.

Figure 1B:
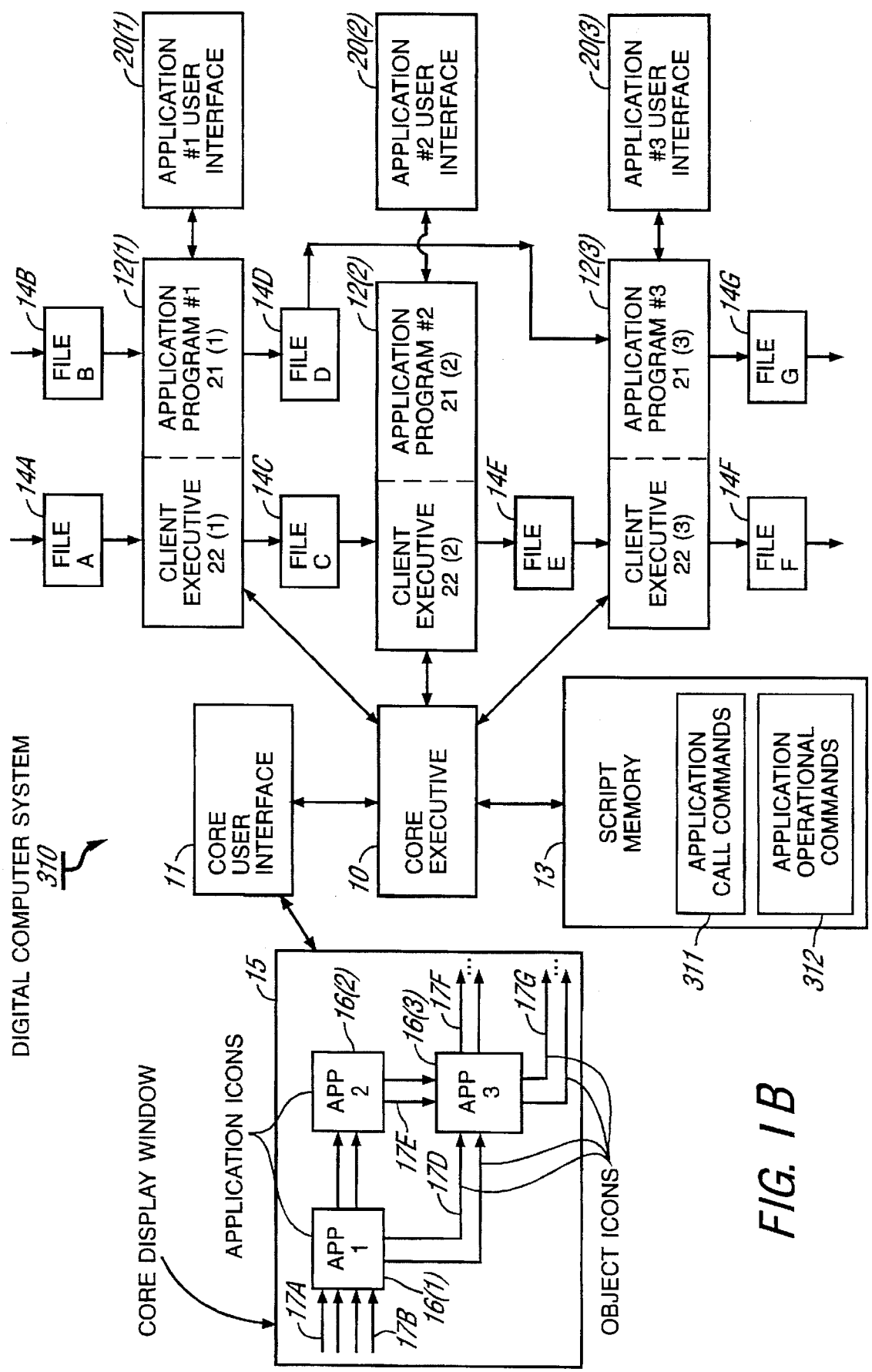
FIG. 1B is a block diagram of a digital computer system constructed in accordance with one aspect of the present invention by programming a conventional digital computer such as the digital computer shown in FIG. 1A.

Turning now to FIG. 1B, there is shown a block diagram of a digital computer system in accordance with the invention that results when the computer 300 of FIG. 1A is programmed with a number of computer programs. These programs include core executive 10 that receives information from a core user interface 11 and applications 12(1) through 12(N) (generally identified by reference numeral 12) as the applications 12 are successively invoked and used by the operator. Each application 12 includes an applications program, generally identified by reference numeral 21, a client executive, generally identified by reference numeral 22, and may also have an associated user interface, generally identified by reference numeral 20. The core executive 10, upon receipt of an application invocation request from an operator through its core user interface 11 during a recording session, enables the digital data processing system's operating system (not shown) to load and begin processing the application 12 in a conventional manner.

An application 12 invoked by the core executive 10 includes an applications program portion, generally identified by reference numeral 21, and a client executive portion, generally identified by reference numeral 22. The applications program portion 21 performs the particular processing operations for the application 12, such as performing word processing operations, spreadsheet operations, database operations, and so forth, depending on the particular program operations to be performed by the application 12 as needed by the operator.

Generally, the client executive 22(i) ("i" is an integer) associated with an applications program portion 21(i), during a recording session, receives commands entered by the operator through the user interface 20(i) associated with the particular applications program 21(i). The client executive 22 transmits the commands to the core executive 10, which stores the commands, along with information about the application, in a script memory 13, as described below in connection with FIGS. 2A to 2D. The commands stored in the script memory include application call commands 311 and application operational commands 312.

During a recording session, the operator my enable the core executive 10 to invoke a number of applications 12, and may record commands entered by the operator for each of the applications 12, and the core executive, in the script 13 created during the recording session, maintains the order or sequence in which the operator issued commands to the applications across all of the applications 12. Thus, for example, if the operator issued commands to two different applications 12 in an interleaved manner, such that a command was issued to one application 12(i), then to a second application 12(j) ("j" being an integer) which may be running concurrently with application 12(i), and then another command to application 12(i), the core executive 10 notes, in the command sequencing, that the operator issued a command to application 12(i), and then to application 12(j), and finally to application 12(i).

After the recording session, the operator may enable the core executive 10 to "play back" the script 13 during a playback session. Generally, in this operation, the core executive 10 invokes the applications 12 in the same ordering relationship in which they were invoked during the recording session. During the playback session, each application 12 also includes a client executive portion 22 and an applications program portion 21, as during the recording session, and each application 12 may also include an associated user interface 20. After invoking an application 12, the core executive 10 transfers the set of commands recorded during the recording session, along with command sequencing information, to the client executive 22. The client executive 22 thereafter enables the application program portion 21 to execute the commands in the order in which they were recorded.

During a playback session, the core executive 10 and client executive 22 for each application 12 interact to ensure that the command sequencing is correct from a global standpoint. That is, using the example in the preceding paragraph, if the script 13 identifies commands to application 12(i), 12(j) and 12(i) as being sequentially entered during a recording session, the client executive 22(i) issues the first command to application 12(i), notifies the core executive 10 when the command has been executed, and then stalls issuing commands to the application 12(i). The core executive 10 then notifies client executive 22(j) of application 12(j), which then enables the application program 21(2) to execute the intermediate command, and thereafter notifies the core executive 10 when the command has been executed, after which it stalls issuing commands to the application 12(j). The core executive 10 then notifies the client executive 22(i) to issue the next command to the application program 21(1), which it does. This enables the core executive 10 and client executives 22 to maintain the order of command sequencing when the operator has, during a recording session, issued commands to the applications in an interleaved manner.

More specifically, of particular note, during a recording session, the core executive 10 records, for each application 12, commands relating to opening and closing of objects by the application 12, as well as the import of data by the application 12 from an opened object or export, that is, storage of, processed data in an opened object by the application 12. An object may comprise, for example, a file, record, or the like, which may be identified and manipulated as a unit by the application 12. In addition, an object may comprise a conventional clipboard (not shown) provided by the executive 10. In one embodiment, during a recording session, the executive 10 maintains, on a video display in the digital data processing system, a builder display window 15 that depicts a block (generally identified by reference numeral 16) representing each application 12 called by the operator during a session, and showing, by means of arrows (generally identified by reference numeral 17) interconnecting the various blocks, the objects through which the applications 12 pass data.

During one specific recording session as illustrated in FIG., 1B, involving applications 12(1), 12(2) and 12(3), the operator first invokes and operates application 12(1). During operation of application 12(1), the operator, through the application's user interface 20(1) issues commands to the application 12(1), in the process enabling application 12(1) to use data from two objects, namely, objects identified as files 14A and 14B, and to store data in objects identified as files 14C and 14D. In FIG. 1B, the direction of the arrow from an object to an application 12 indicates whether the application uses data from an object or stores data in an object. If the arrow points from an object to an application 12, the application 12 uses data from the object, and if the arrow points from an object to an application 12, the application 12 stores data in the object. Although not shown in FIG. 1B, an application 12 may both use data from an object and store data in the same object, in which case the arrow would point in both directions. It will be appreciated that objects 14A and 14B may have been created by other applications 12 (not shown) either during the recording session depicted in FIG. 1B or during other processing of the digital data processing system.

Figures 3, 3A:
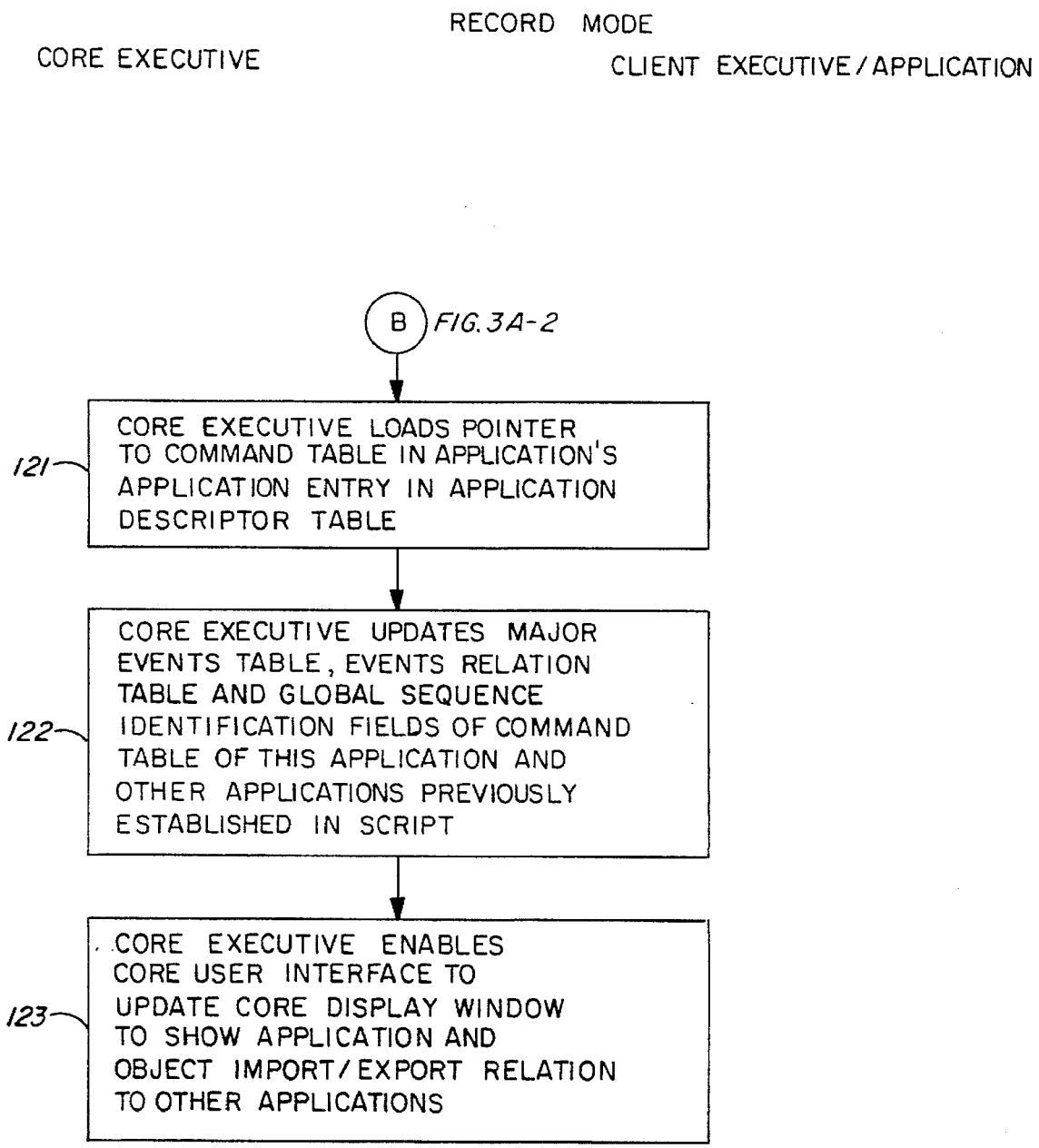
Figures 1, 3B:
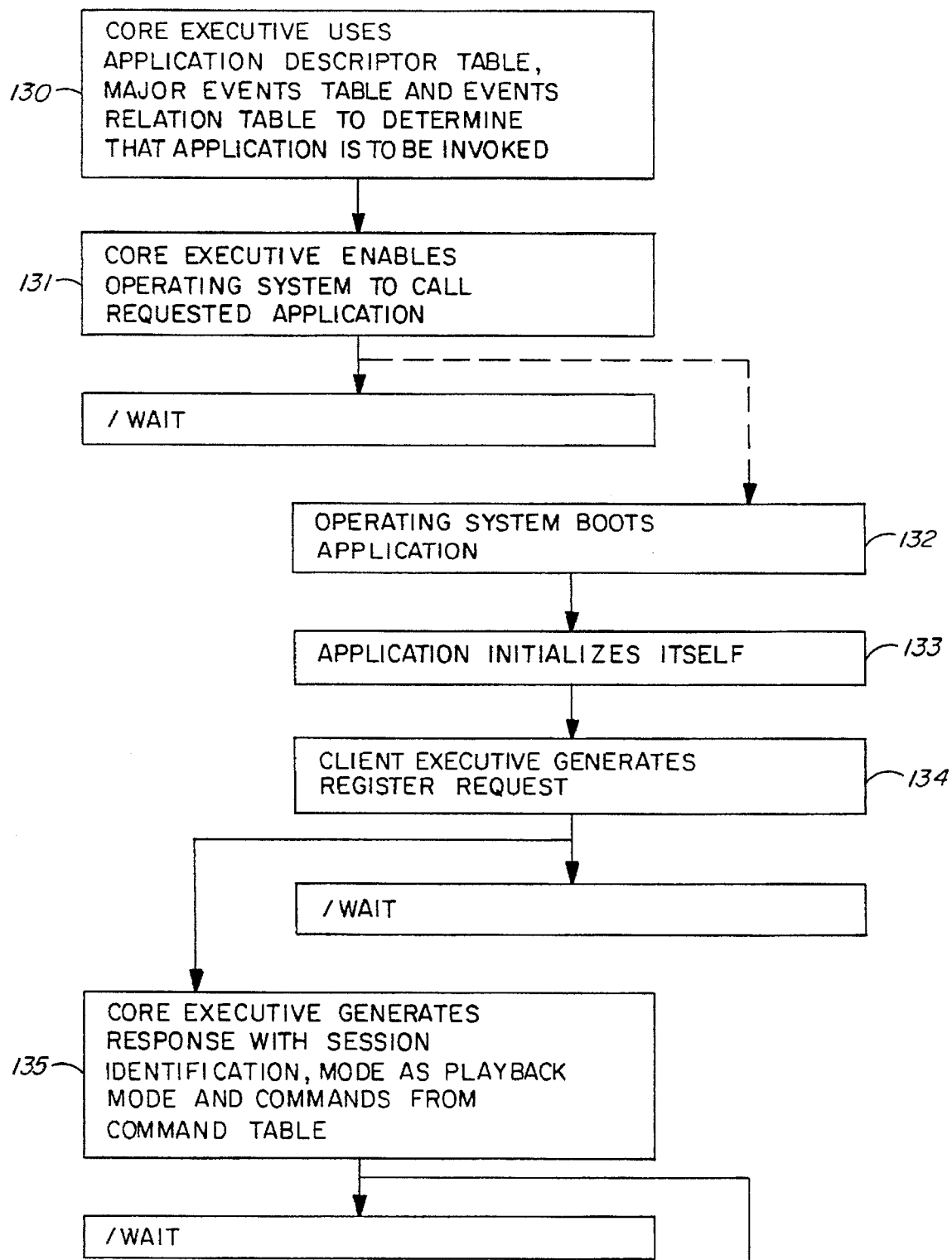
Figures 2, 3B:
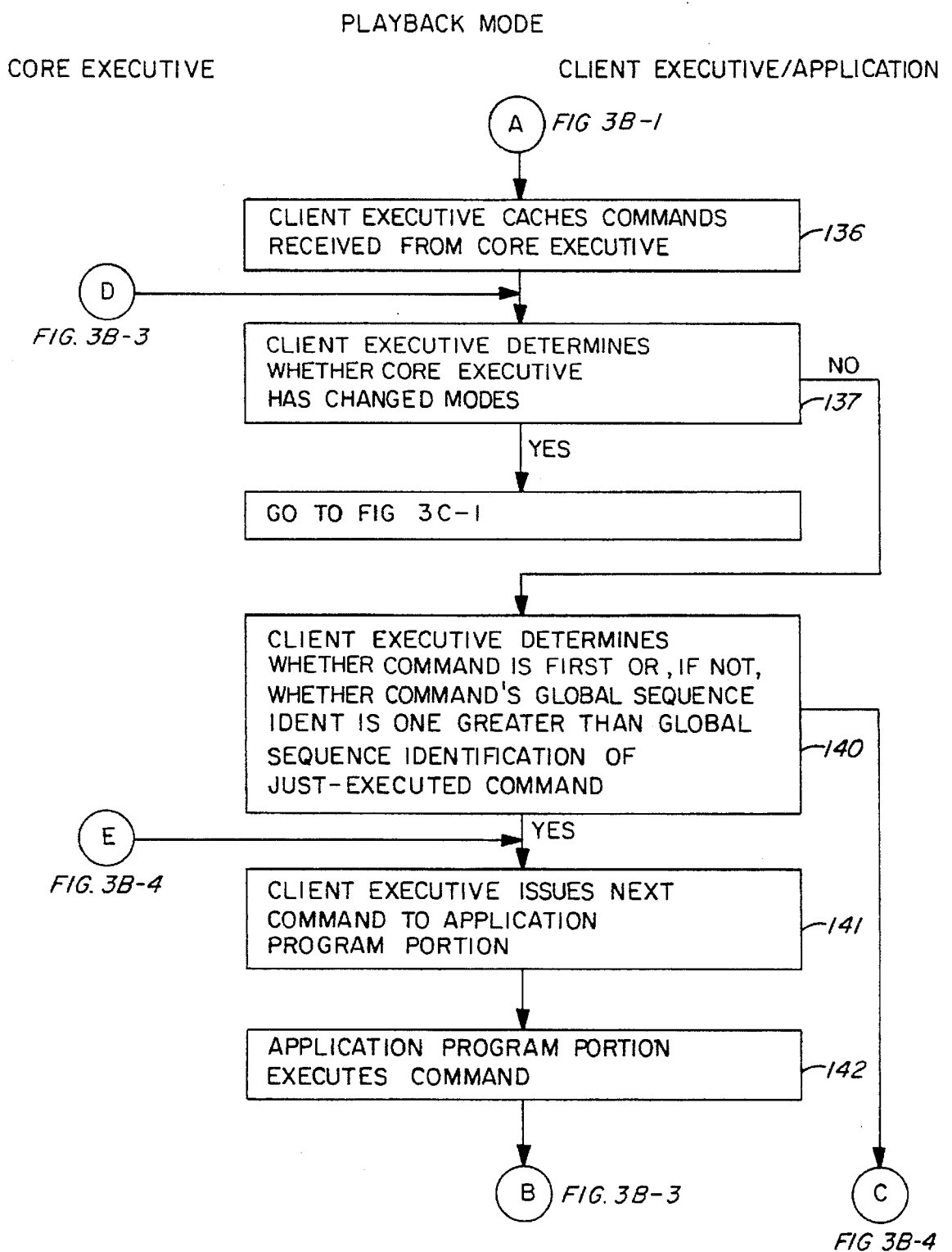
Figures 3, 3B:
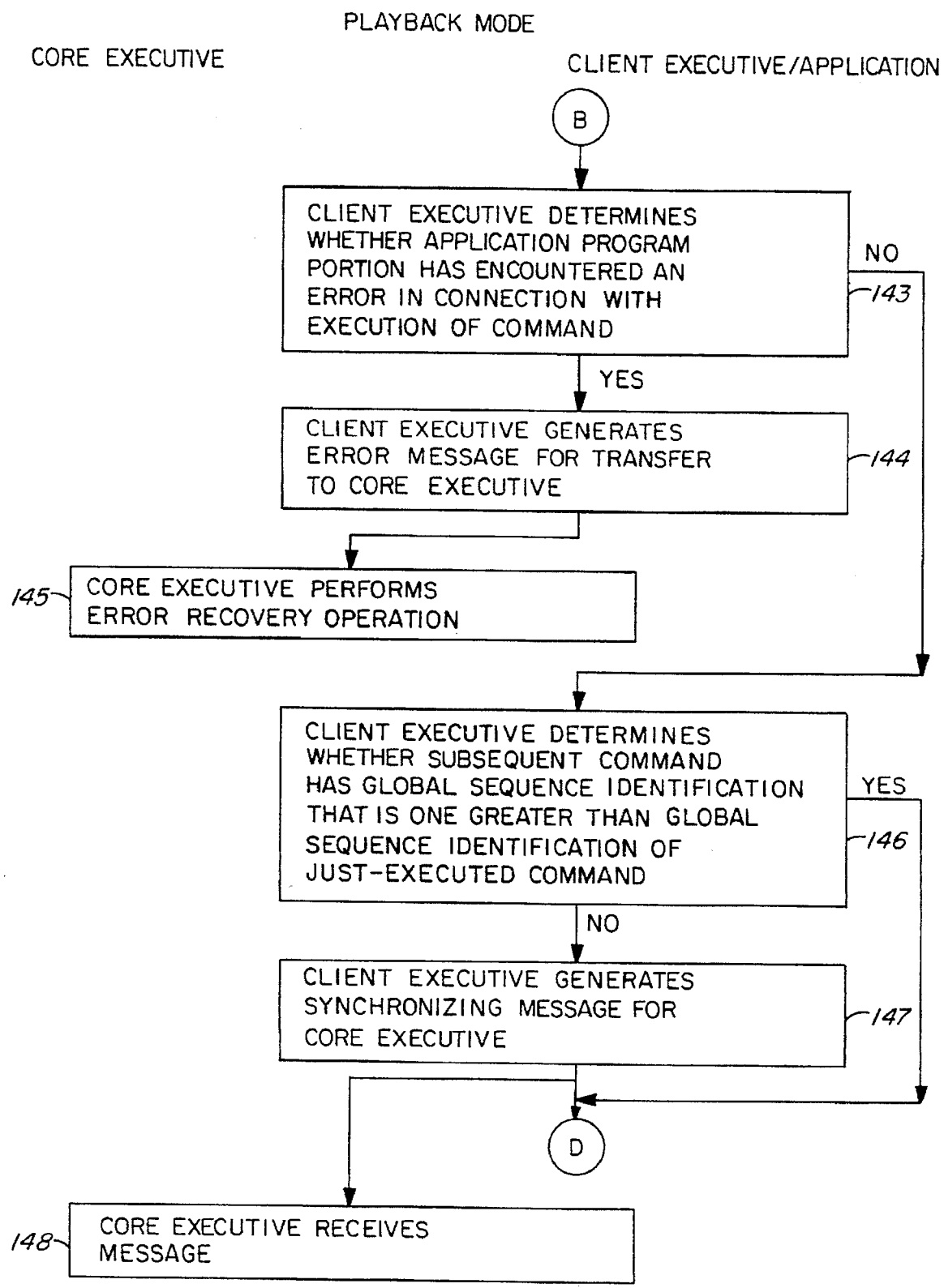

Continuing with the illustrative recording session depicted in FIG. 1, at some time during the session, the operator, through user interface 20(1), may enable application 12(1) to terminate, and invoke application 12(2). The operator may invoke application 12(2) either following termination of, or contemporaneous with, use of application 12(1). During operation of application 12(2), the operator, through user interface 20(2) of application 12(2) also issues commands to the application 12(2). During operation, the application 12(2), in response to selected commands from the input module 11, uses data from one object, identified as file 14C, and stores data in an object identified as files 14E.

Similarly, during the recording session the operator, invokes application 12(3). The operator may invoke application 12(3) either following the termination of, or contemporaneous, with, use of application 12(2). During operation of application 12(2), the operator, through user interface 20(3), also issues commands to the application 12(3), in the process enabling application 12(3) to use data from two objects, identified as file 14D and 14E and to store data in objects identified as files 14F and 14G.

During the session illustrated in FIG. 1B, the application program portion 21(i) of an application 12(i) receives a command from the associated user interface 20(i), passes the command to its associated client executive 22(i), and also executes the command. The client executive 22(i) caches or otherwise records the command as received from the application program portion 21(i), along with a time stamp indicating the time it received the command. At some point later, the client executive 22(i) transmits the cached commands, along with the time stamps, to the core executive 10. The client executive 22(i) may transmit the commands either when the operator terminates the application 12(i) through its user interface 20(i), or earlier in response to a request therefor from the core executive 10, which the core executive 10 transmits in response, in turn, to a command therefor which it receives from the operator through its core user interface 11. The command transmission may be through a buffer in memory or a disk file if the client executive 22(i) and core executive 10 are being processed by the same computer, or by means of messages transmitted over, for example, a network if they are being processed by different nodes in a distributed digital data processing system.

When the core executive 10 receives commands from a client executive 22, it records them in script 13, establishing the sequencing for the commands for each of the applications 12 from the client executive based on the time stamps associated with each command. In addition, during the recording session, the core executive 10, through its core user interface 11, maintains a display window 15 through which the operator may view the order in which the applications 12 are called and the relationships therebetween, as indicated by the files and other objects representing the sources of data processed by the applications 12 and into which the applications 12 stores processed data.

In the window 15, the core executive 10 represents each application 12 as a block 16 and each object as an arrow 17.

Thus, for the illustrative session depicted in FIG. 1B, the core executive 10 represents application 12(1) as block 16(1), application 12(2) as block 16(2) and application 12(3) as block 16(3), and files 14A through 14G as, respectively, arrows 17A through 17G. Since, for example, application 12(1) stores processed data in the object identified as file 14C, and application 12(2) obtains data which it processed from file 14C, the core executive 10 displays, in window 15, an arrow 17C, representing file 14C, from the block 16(1), representing application 12(1), to the block 16(2), representing application 12(2). The core executive 10 establishes the other arrows 17 in the display 15 in the same manner.

As described above, after recording a session, the core executive 10 may use the script 13 that was developed during the session to control processing during a subsequent playback session. During a playback session, the core executive 10 effectively plays back the script 13, calling the various applications 12 in the order specified in the script 13 and issuing, to each application 12, the commands that the operator had issued to it during the recording session. In connection with the script 13 developed during the illustrative recording session described above, the core executive 10 will call applications 12(1), 12(2) and 12(3), and issue the commands to the applications that the operator had issued during the recording session. In that process, the core executive 10 will issue commands enabling the applications 12 to retrieve data from, and store processed data in, the various objects that the operator identified in the recording session.

Thus, the core executive 10, by creating the script 13 during the recording session, can effectively generate an integrated application comprising the applications 12 called during the recording session, and using the commands issued by the operator, through the input module 11, dating the session, which it re-created during the playback session.

Before proceeding further, it will be helpful to generally describe the structure of a script 13 and the messages that are transmitted between the core executive 10 and a client executive 22. The structure of a script 13 will be generally described in connection with FIGS. 2A through 2D. Preliminarily, a script 13 is divided into two general portions, namely, a command table portion, which stores a plurality of command tables 70 generally depicted in FIG. 2D, and a "table of contents" portion which includes three tables depicted in FIGS. 2A through 2C. The "table of contents" portion includes an application descriptor table 30 (FIG. 2A), a major events table 50 (FIG. 2B) and an events relation table 60 (FIG. 2C). The application descriptor table 30 includes information as to the various applications 12 which the operator enabled to be invoked by the core executive 10 through the core user interface 11. The major events table 50 identifies selected commands in the command tables, most notably those relating to export and import of data from objects. In addition, the major events table 50 identifies invocation and termination of applications 12 where the order of invocation and termination is determined important. Finally, the events relation table 60 effectively couples events as recorded in the major events table 50 so to relate, for example; export of data to an object by one application 12(i) with import of data from the object by another application 12(j), which may be used, for example, in establishing the arrows 17 on the core display window 15.

Figure 2A:
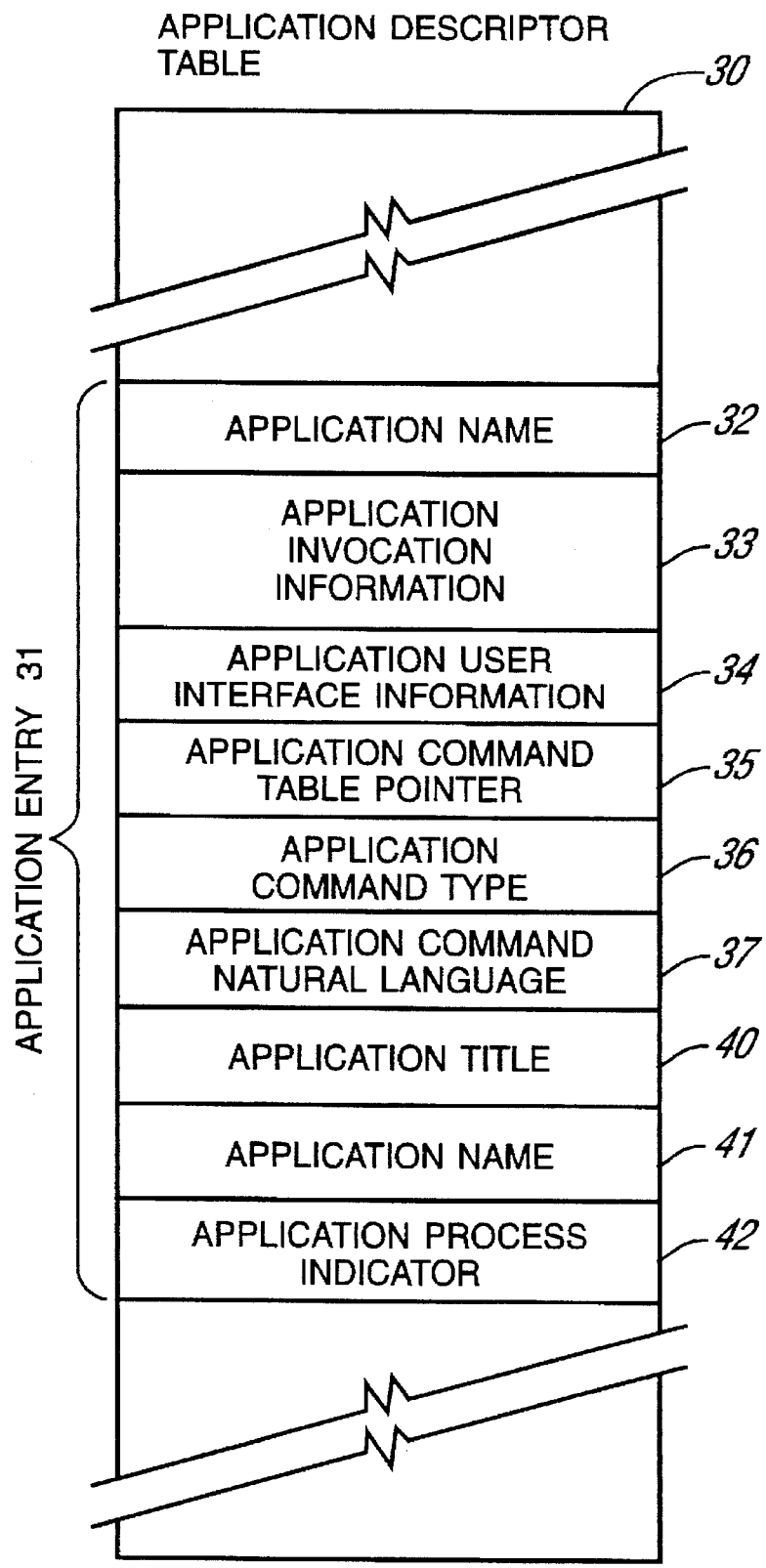
FIG. 2A is a schematic diagram of an application descriptor table for storing application program information in a script memory of FIG. 1B.
Figure 2B:
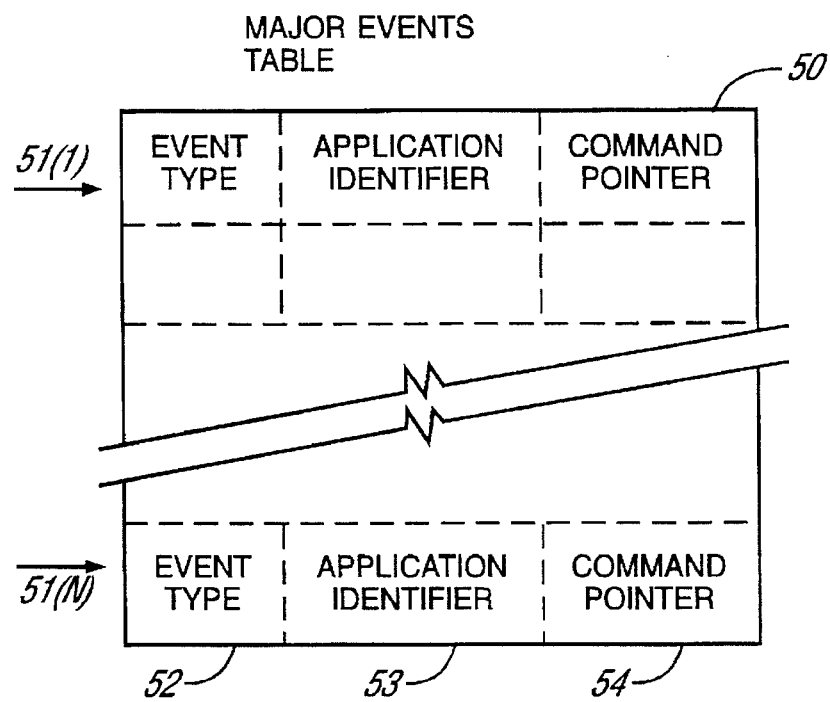
FIG. 2B is a schematic diagram of a major events table for storing event information in the script memory of FIG. 1B.
Figure 2C:
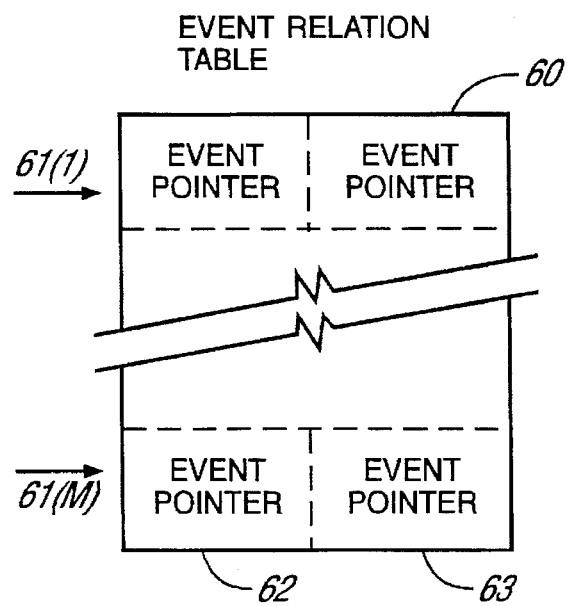
FIG. 2C is a schematic diagram of an events relation table for storing in the script memory information about relations between events.
Figure 2D:
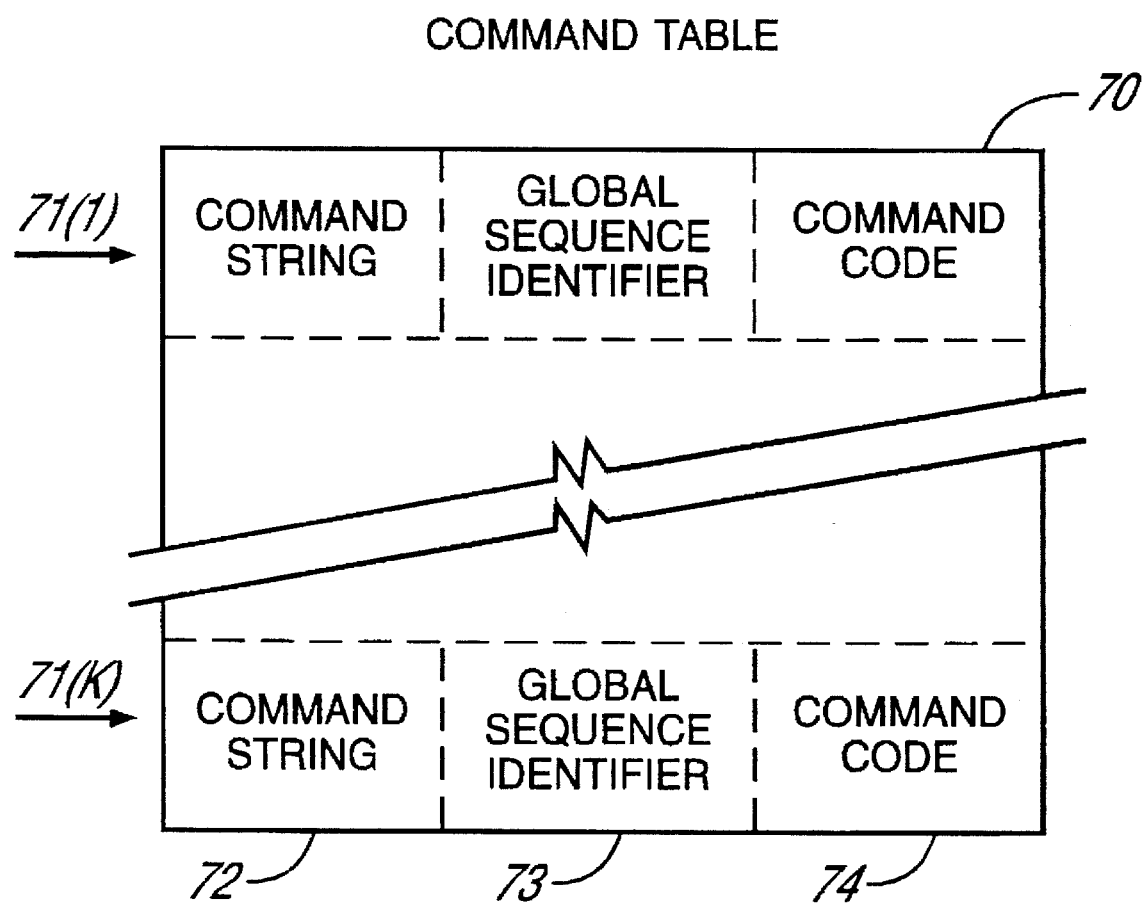
FIG. 2D is a schematic diagram of a command table for storing application call commands and application operational commands in the script memory.

With reference to FIG. 2A, the application descriptor table 30 includes a plurality of application entries 31, each containing information for a particular application 12 invoked during a recording session. The application entry 31 includes several sets of fields, including fields 32 through 34 for information relating to how the application 12 is to be invoked, a command table pointer field 35 containing a pointer to the command table 70 in which commands for the application 12 are recorded, and fields 36, 37 and 40 through 42 for information relating to the application and the nature of the commands stored in the command table 70 identified by the pointer in field 35.

More specifically, an application entry 31 in the application descriptor table includes a name field 32 that identifies the name of the application 12, an invocation information field 33, and a user interface information field 34. The invocation information field 33 contains invocation information which may be required in addition to the application name, such as the identification of a directory in which the image of the application 12 may be located, the particular node of a distributed digital data processing system which may be processing the application 12, various parameters and arguments used by the operator in invoking the application 12 during the recording session, and so forth.

The user interface information field 34 may contain information which may be required to set up a particular user interface 20 for the application 12 upon invocation. If the user interface 20 is, for example, a windowing system, the user interface information field 34 may contain such information as the size of a window required, as indicated during the recording session. In addition, the user interface information field 34 may indicate whether or not a user interface is required; some types of applications, such as some compilers, may not require a user interface or may not have a user interface during a particular recording session, and that information may be stored in the user interface information field 34.

As noted above, the application entry 31 also includes a field 35 that points to a command table 70. The application entry 31 also contains a command type field 36 that indicates whether commands that the core executive 10 will receive from the application's client executive 22 are in a form which will be meaningful to a person reading them. This may indicate, for example, whether the commands are in the form of characters or symbols in a natural language which may be read by a user to identify the command. If the commands in the command table are in a natural language, a command natural language field 37 identifies the natural language. A command procedural indicator field 42 indicates whether every input provided by an operator through the user interface 20 of the associated application is a command, or whether the inputs may also comprise data that may be processed by the application 12.

The application entry also contains a title field 40 and a name field 41, in which the operator may, upon invocation of the application, store a title for the application and a session name which may indicating information as to the processing to occur during the session. For example, if the application 12 is an accounting program, and the session is to perform tax accounting, title field 40 may contain the name of the application 12 and the name field 41 may contain a character string "TAX" or a mnemonic indicating that the session relates to tax computations. The core executive may use the information in the fields 40 and 41, as well as fields 36 and 37, to, in turn, enable the core user interface 11 to establish a window (not shown), which is additional to a window that may be provided by user interface 20, in which the core executive 10 displays the commands that it receives from the application 12 during the recording session, if the command type information in field 36 indicates that the commands can be read by, and meaningful to, an operator, and if the natural language information in field 37 indicates that the commands were recorded in the operator's natural language. The core executive 10 may use the title and name information in fields 40 and 41 as the title and name of the window.

The major events table 50 (FIG. 2B) identifies selected commands in the command tables 70, as described above, which may be of importance in connection with sequencing of invocation of applications 12 and issuing of selected commands by the invoked applications 12. The major events table includes a plurality of entries, generally identified by reference numeral 51, each having three fields 52 through 54. In each entry 51, an event type field 52 identifies an event type, that is, whether the event recorded in the entry 51 relates to import of data, export of data, invocation of an application 12, or termination of an application 12. An application identification entry 53 identifies the application 12 with respect to which the event, identified by type in field 52, occurred. Finally, a command pointer field 54 identifies the specific command in the command table 70 that caused the event, that is, the import, export, invocation or termination, to occur during the recording session.

Finally, the events relation table 60 effectively couples events as recorded in the major events table 50 so to relate, for example, export of data to an object by one application 12(i) with import of data from the object by another application 12(j), or termination of one application with invocation of another. The events relation table 60 includes a plurality of entries, generally identified by reference numeral 61. Each entry 61 in the events relation table 60, in turn, includes a pair of pointers in fields 62 and 63. Each pointer points to an entry 51 in the major events table 50. Accordingly, the pair of pointers in each entry 61 effectively associates pair of events in the major events table 50, such as export of data to an object by one application 12(i) and import of data therefrom by another 12(j), or termination of an application with invocation of another.

As noted above, the script 13 also includes one command table 70 for each of the applications 12 invoked during a recording session. Each command table 70 includes a plurality of entries, generally identified by reference numeral 71, each for storing one command received during the recording session. Each entry includes three fields, including a command string field 72, a global sequence identification field 73 and a command code field 74. The command string field 72 stores the command string, that is, the command as entered by the operator through the user interface 20, as received by the core executive 10 from the client executive 22 during the recording session. If the application 12 responds to commands that are in a natural language-independent form, that is, in a code form that does not necessarily correspond to any natural language, as well as to corresponding commands that are in a natural language, the command string field 72 may include a natural language subfield for storing the natural language command string and a language-independent sub-field for storing the language-independent portion. If the command string fields 72 in the entries 71 stores command strings in a natural language, the command natural language field 37 in the application entry 31 stores the identification of the commands' natural language.

The global sequence identification field 73 in each entry 71 in the command table 70 stores a sequence identifier identifying the sequence in which the command, in the command string field 72, is to be issued to the respective application 12, among all of the commands, as recorded in all of the command tables 70 in the script 13, to be issued during a playback session. The core executive 10 generates the sequence identifier for storage in the global sequence identification field 73 based on the time stamps associated with each of the commands received from the client executives 22 during a recording session.

Finally, the command code field 74 may contain a code flagging particular types of commands, such as commands relating to importation or exportation of data or commands relating to invocation or termination of applications. The codes may be used, for example, in the construction of the major events table 50 (FIG. 2B) and events relation table 60 (FIG. 2C).

With this background, the operations performed by the core executive 10 and an application 12, including both a client executive 22 and an application program portion 21, during a recording session are generally depicted in FIGS. 3A-1 through 3A-3, and the operations performed during a playback session are generally depicted in FIGS. 3B-1 through 3B-4. With reference to FIG. 3A-1, during a recording session the operator, through a command given through the core user interface 11, requests the invocation of the application 12 (step 100). The core executive 10 then (step 101) establishes various portions of the script 13 for the application 12 to be invoked. In particular, the core executive 10 generates and fills an application entry 31 for the application in the application descriptor table 30 (FIG. 2A) into that entry 31. Contemporaneously, the core executive 10 establishes an entry 51 in the major events table 50 to record the invocation, and, if the invocation follows termination of another application 12, the core executive 10 enters, in an entry 61 in the events relation table 60, pointers to the entries 51 in the major events table 50 identifying the termination and invocation of the respective applications. Furthermore, the core executive establishes a command table 70 for the application 12 to be invoked and loads a pointer thereto in the command table pointer field 35 in the application entry 31. After establishing various portions of the script 13 in step 101, the core executive 10 enables the operating system to call the requested application (step 102).

The operating system thereafter boots the application 12 (step 103), which proceeds to initialize itself in a conventional manner (step 104). Following initialization (step 104), the application 12, specifically, the client executive 22, generates a register request message (step 105), which it transmits to the core executive 10. In the register request message, the client executive 22 identifies the application 12 to the core executive 10, and provides some additional information, including its name and a main callback procedure pointer. The arrangement depicted in FIG. 1B can be used in connection with a number of diverse types of mechanisms for facilitating communications among processes; in one specific embodiment, used in connection with the X-Windows display system, the communications are through widgets provided by the X-Windows display system, and so in the register request message the application 12 identifies a widget that the core executive 10 can use to communicate with it. The main callback procedure pointer points to the application's main callback entry point. In addition, the register request message identifies any parameters used by the operator in calling the application 12 in step 100, which the core executive 10 stores with the application call in the script 13.

If it is operating in a recording session, the core executive 10, after receiving the register request message, generates a response that includes a session identifier and a mode indicator (step 106). The mode indicator indicates that the session is a recording session. The core executive 10 can operate in a plurality of recording and playback sessions concurrently, with each recording session and each playback session being associated with a particular script 13, and the session identifier identifies one particular recording session. The core executive 10 thereafter may display an icon, such as a block 16, in its display window 15. It will be appreciated that the core executive 10 may not be operating in a recording session, in which case it will either not, in step 106, generate a response at all, or it may generate a response with a null session identifier.

The application 12, if it receives a response to its register request message, joins the session identified by the session identification in the response (step 110, FIG. 3A-2), and enables its user interface 20, if any, to be displayed. The application 12 uses the session identification in subsequent messages to the core executive 10, to identify the messages as being related to the session identified by the session identification. After joining a session, the application 12 may generate a set application information message, in which the application 12 may provide information about itself for use by the core executive 10 during the session. In one embodiment, the information passed by the application 12 in the set application information message includes the application's name, version number, a title, a command string to be used by the core executive 10 in invoking the application 12 during a later playback session, and so forth, which the core executive may store in respective fields in the application's application entry 31 in the application descriptor table 30.

In any event, after joining the session (step 110), the application 12 proceeds to step 111 to begin processing inputs, including commands and data, provided by the operator through the application's user interface 20. The application 12 is effectively controlled by the client executive 22, which receives the commands entered by the operator through the user interface 20. The client executive 22 waits until the operator issues a command to the application 12 through the application's user interface 20 (step 111), at which point it caches the command (step 112) along with a time stamp identifying the time the operator issued the command. If the command is one which does not terminate the application 12 (step 113), the client executive 22 enables the application program portion 21 to execute the command and returns to step 111 to wait for the next command. If, during use of the application 12, the operator, through the user interface 20, enters data not comprising a command for processing by the application 12, the client interface 22 may transfer that data to the application program portion 21 for use in its processing.

At some point during use of application 12, the operator, through user interface 20, issues a termination command that enables the application to terminate. As with other types of commands, the client executive 22 receives the command (step 111) and caches it (step 112), and thereafter determines that the command is a termination command (step 113). At that point, the client executive generates a message to transfer the cached commands, including the termination command, along with the respective time stamps, to the core executive 10 (step 114), and enables the application to terminate (step 115).

As noted above, the mechanism used by the client executive 22 to actually transfer the commands to the core executive 10, in step 114, depends on several factors. If, for example, the client executive 22 and core executive 10 are being processed by the same computer, the client executive 22 may load the cached commands into a disk file which is accessible by both the client executive 22 and the core executive 10, and transfer an identifier for the disk file to the core executive 10. On the other hand, if the client executive 22 and core executive 10 are being processed by, for example, different nodes in a distributed digital data processing system, such that they may not have access to the same disk files, the client executive 22 may transmit the commands to the core executive by means of messages over a network in a conventional manner.

When the core executive 10 receives the cached commands from the client executive 22, it loads them into the application's command table 70 in script 13, that is, the command table 70 identified by the contents of command table pointer field 35 in the application's application entry 31 in application descriptor table 30 (step 121). In addition, the core executive 10 will establish entries in the major events table 50 and events relation table 60 as necessary, to reflect the commands in the command table 70 relating to importation of data from, and exportation of data to, respective objects, and termination of the application 12 (step 122) and enables the core user interface 11 to update the core display window 15 to reflect the application 12 and its import/export relation to other applications.

While not depicted in FIGS. 3A-1 through 3A-3, in one embodiment the core executive 10 may during a recording session, enable the client executive to transfer to it the commands which it has previously received and cached. In that operation, the operator, through the core user interface 11, enables the core executive to generate a message for transfer to the client executive 22, that, in turn, enables the client executive 22 to transfer the cached commands to the core executive 10. The client executive 22 uses the same command transfer mechanism as described above (in connection with step 115) to transfer the cached commands to the core executive 10. Upon receipt of the commands from the client executive 22, the core executive 10 performs the same operations, as described above in connection with steps 120 through 123, in connection with the commands. Thereafter, when the operator terminates the application 12, the client executive 22 may transfer either the entire set or cached commands to the core executive, or it may transfer only those which have not been previously transferred.

In the same embodiment, the operator, through core user interface 11, may enable the core executive 10 to abort use of an application 12 and to not record the command table 70 therefor in the script 13. In that embodiment, the core executive 10 issues a terminate command to the client executive 22, which terminates the application 12. If the operator has indicated that the application's command table 70 is to be recorded, the client executive 22 transfers the cached commands to the core executive as described above prior to terminating the application 12.

Thus, it will be appreciated that the core executive 10, during a recording session, iteratively receives and records invocations of applications 12 during a session, and receives and records commands issued to each application 12. At the end of the recording session, the core executive 10 establishes the global sequencing identifications in fields 73 of the entries 71 in the various command tables 70 in the script 13 to reflect the order in which the operator issued commands to the various applications 12.

After generating a script 13 during a recording session (FIGS. 3A-1 through 3A-3), the core executive 10 may perform a playback session in which it uses the script 13. During a playback session, the core executive 10 invokes the applications 12 which were invoked during the recording session and issues the commands which were recorded during the recording session are transmitted to the applications 12 invoked during the recording session in the order identified by the script 13. The operations performed during a playback session. The commands which were recorded during the recording session are generally described in connection with FIGS. 3B-1 and 3B-4. With reference to FIG. 3B-1, the core executive 10 uses the sequential application entries 31 in the application descriptor table 30 (FIG. 2A), the major events table 50 (FIG. 2B) and the events relation table 60 (FIG. 2C) to control the sequencing of the invocation of each of the applications 12. When the core executive 10 determines that an application identified by an entry 31 in the application descriptor table 30 is to be invoked (step 130), the core executive 10 enables the operating system to call the required application 12 (step 131).

The operating system, upon receipt of an application boot request from the core executive 10 in step 131, boots the requested application 12 (step 132). The application initializes itself (step 133) and generates a register request message which it transmits to the core executive 10 (step 134), in a similar manner as described above (steps 104 and 105, FIG. 3A-1). The core executive 10 then (step 135) generates a response message with a session identification, a mode identification identifying the mode as the playback mode, and the set of commands from the application's command table, each command being accompanied by its associated global sequence identification. The core executive 10 may transmit the commands by, for example, loading them into a disk fie identified in the response message if it and the client executive of the application 12 are being processed by the same computer, or network messages if they are being processed by different nodes in a distributed digital data processing system.

Upon receipt of the commands, the client executive caches them (step 136) and begins issuing them to the application program portion 21. Initially, the client executive 22 verifies that the core executive 10 has not changed modes (step 137) to, for example, a step mode, in which the client executive waits for a step message from the core executive 10 before issuing a command to the application program portion 21, or a splice mode, in which the core executive 10 enables the client executive to temporarily pause in issuing commands to the application program portion 21 and record commands that the operator provides through the application's user interface 20. Operations during both of these are described in greater detail below in connection with FIGS. 3C-1 through 3C-3.

If the client executive 22 determines, in step 137, that the core executive has not changed the mode from the playback mode, it sequences to step 140, in which it determines whether the next command is the first command in the command table, or, if not, if its associated global sequence identification is one greater than the global sequence identification of the previously-executed command. If the next command is not the first command from the command table, and if its global sequence identification is more than one greater than that of the previously-executed command, a command for another application must be executed first, and so the client executive 22 obtains synchronization assistance from the core executive 10, as described below in connection with FIG. 3B-4, before issuing the command.

If, however, the client executive 22 determines, in step 140, that the next command is the first command in the command table, or, if not, if its associated global sequence identification is one greater than the global sequence identification of the previously-executed command, it can issue the command to the application program portion 21 without synchronization assistance from the core executive 10. In that case, the client executive 141 issues the next command (step 141) to the application program portion 21, which executes the command (step 142). The client executive 22 monitors the execution of the command by the application program portion 21 and, if it encounters an error (step 143), the client executive 22 generates an error message for transfer to the core executive 10 (step 144). The core executive may then perform selected error recovery operations (step 145). For example, if the error is the result of improper command syntax, the core executive 10 may enable its core user interface 11 to, in turn, permit the operator to supply a new command with proper syntax, which the core executive 10 may transfer to the client executive 22, which, in turn, can issue the new command to the application program portion. Similarly, if the command specifies use of a named file which does not exist, the core executive may enable the operator to provide the name of another file to be used.

If the client executive 22 determines in step 143 that the application program portion 21 executed the command without error, it sequences to step 146. In step 146 the client executive determines whether it needs to provide synchronizing information to the core executive 10. If the client executive 22 determines that the global sequencing identification of the next cached command is more than one greater than the one that was executed in step 142 (step 146), it generates a synchronizing message (step 147), which it transmits to the core executive (step 148). The core executive then uses the synchronizing message to control command execution by another application 12.

Figures 3, 3B, 4:
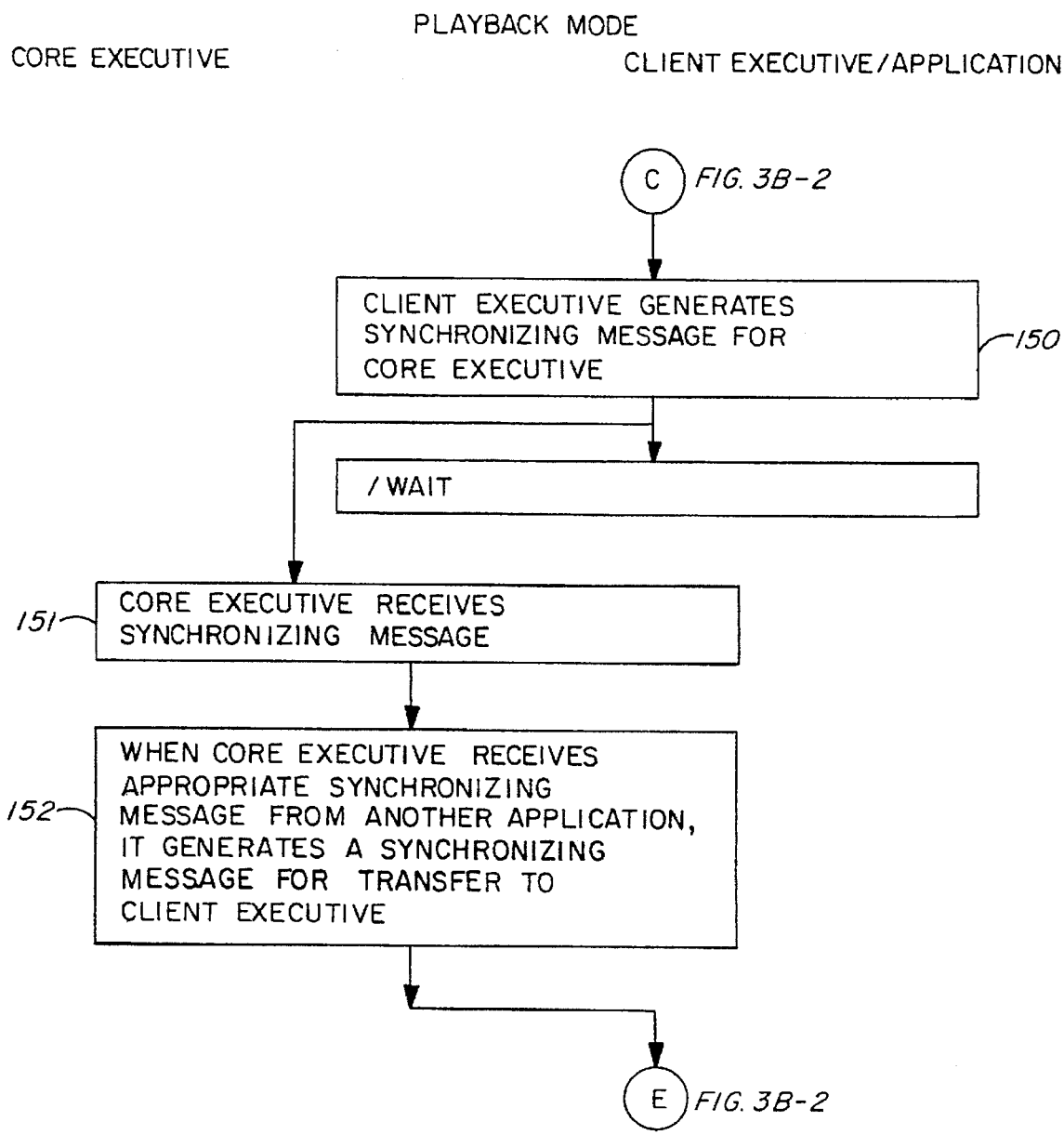

Returning to step 140 (FIG. 3B-2), as noted above if the client executive determines that the global sequencing identification associated with the command is more than one greater than the global sequencing identification of the just-executed command, the client executive 22 sequences to step 150 (FIG. 3B-4) to obtain sequencing assistance from the core executive 10, to ensure that the commands, as executed by all applications 12, are executed in the order entered by the operator during the recording session. With reference to FIG. 3B-4, after step 140, the client executive 22 first generates a synchronizing message for transfer to the core executive (step 150), and stalls. In this message, the client executive identifies the global sequencing identification of the next command. The core executive 10 receives the synchronizing message (step 151) and, when it receives notification from another client executive 22, in a synchronizing message generated by it during its processing of step 146, that identifies that global sequencing identification, it generates a synchronizing message for transfer to the stalled client executive 22 (step 152). The stalled client executive 22 then returns to step 141 to process the command.

Figures 1, 3C:
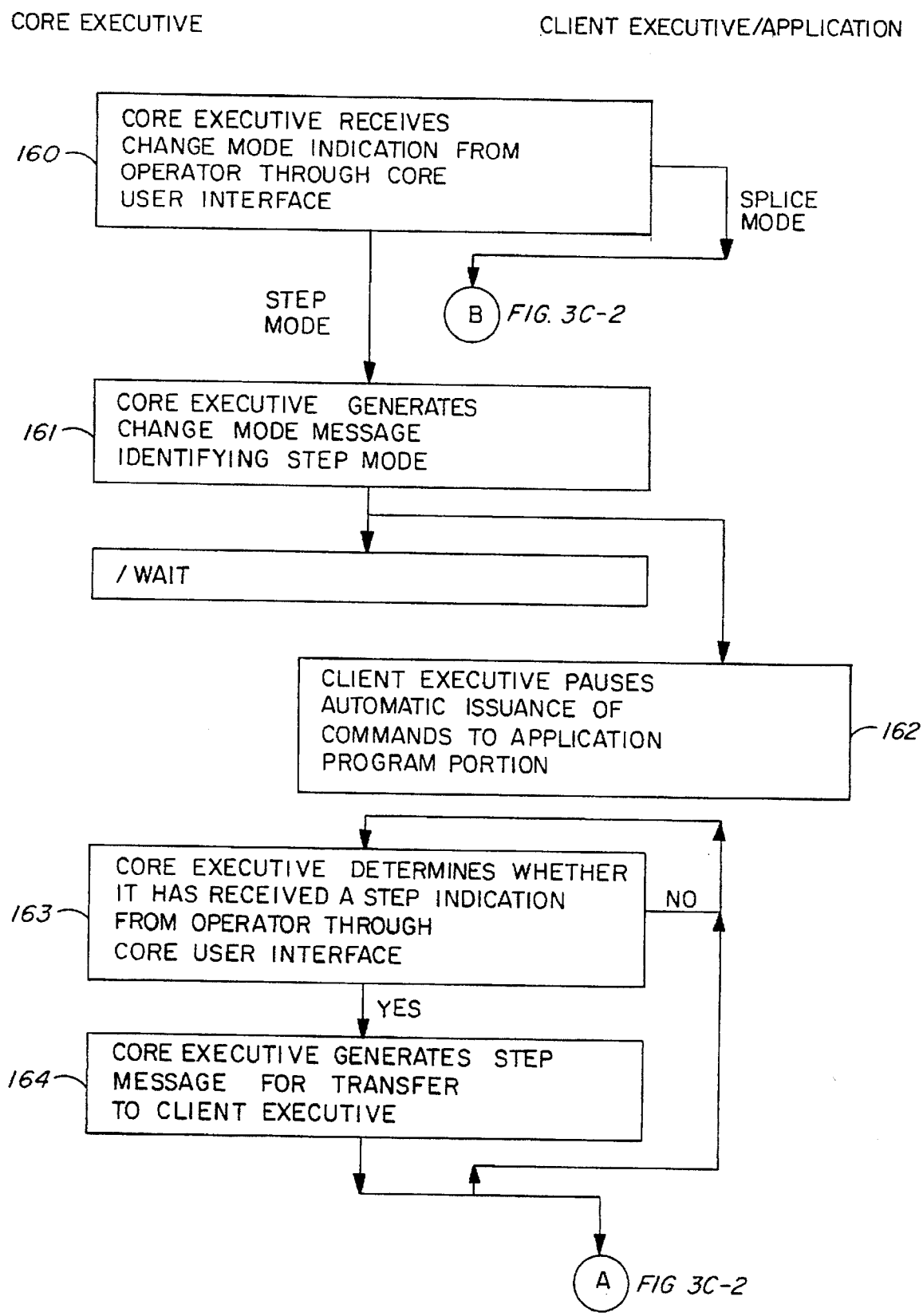
Figures 2, 3C:
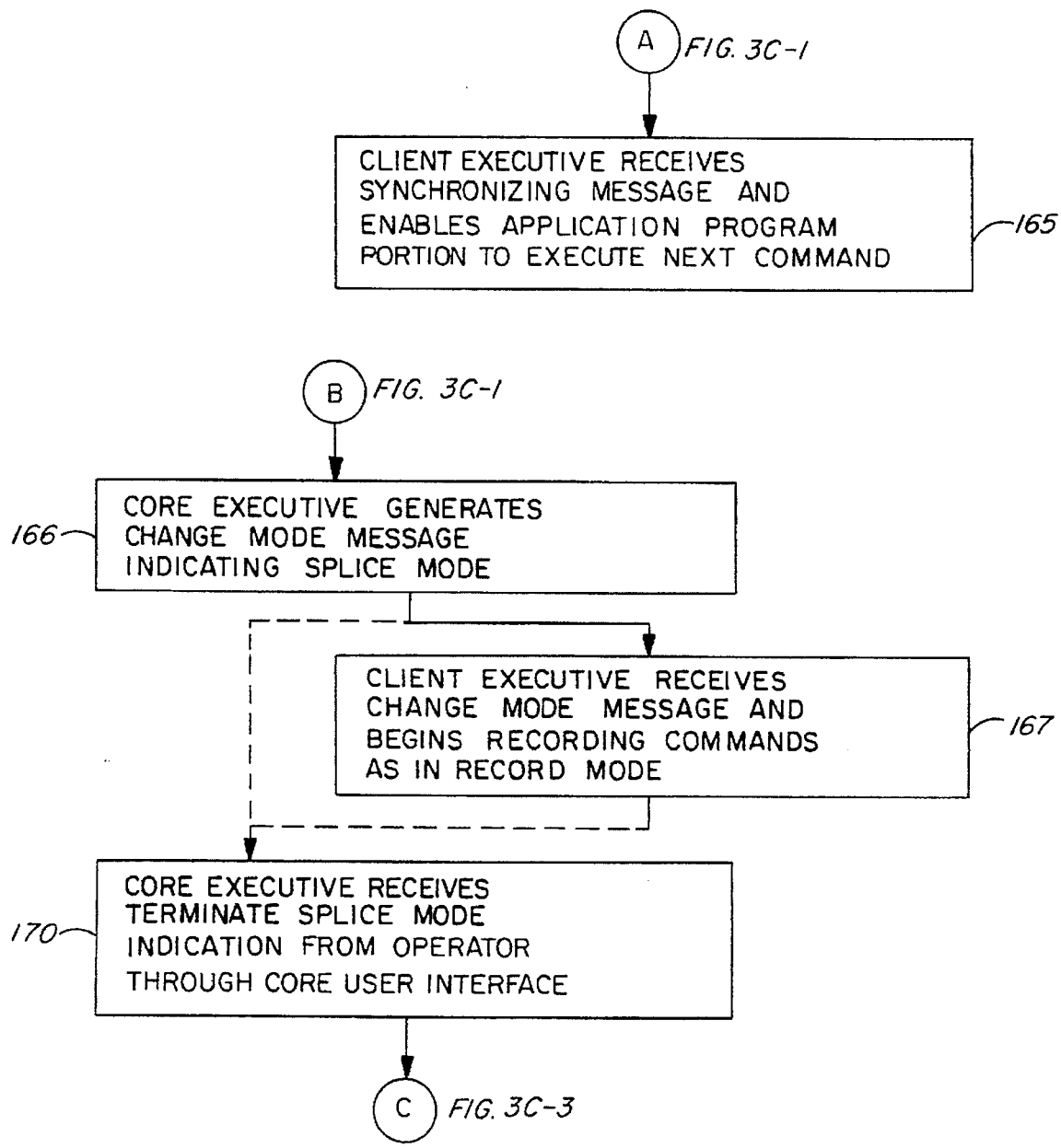
Figures 3, 3C:
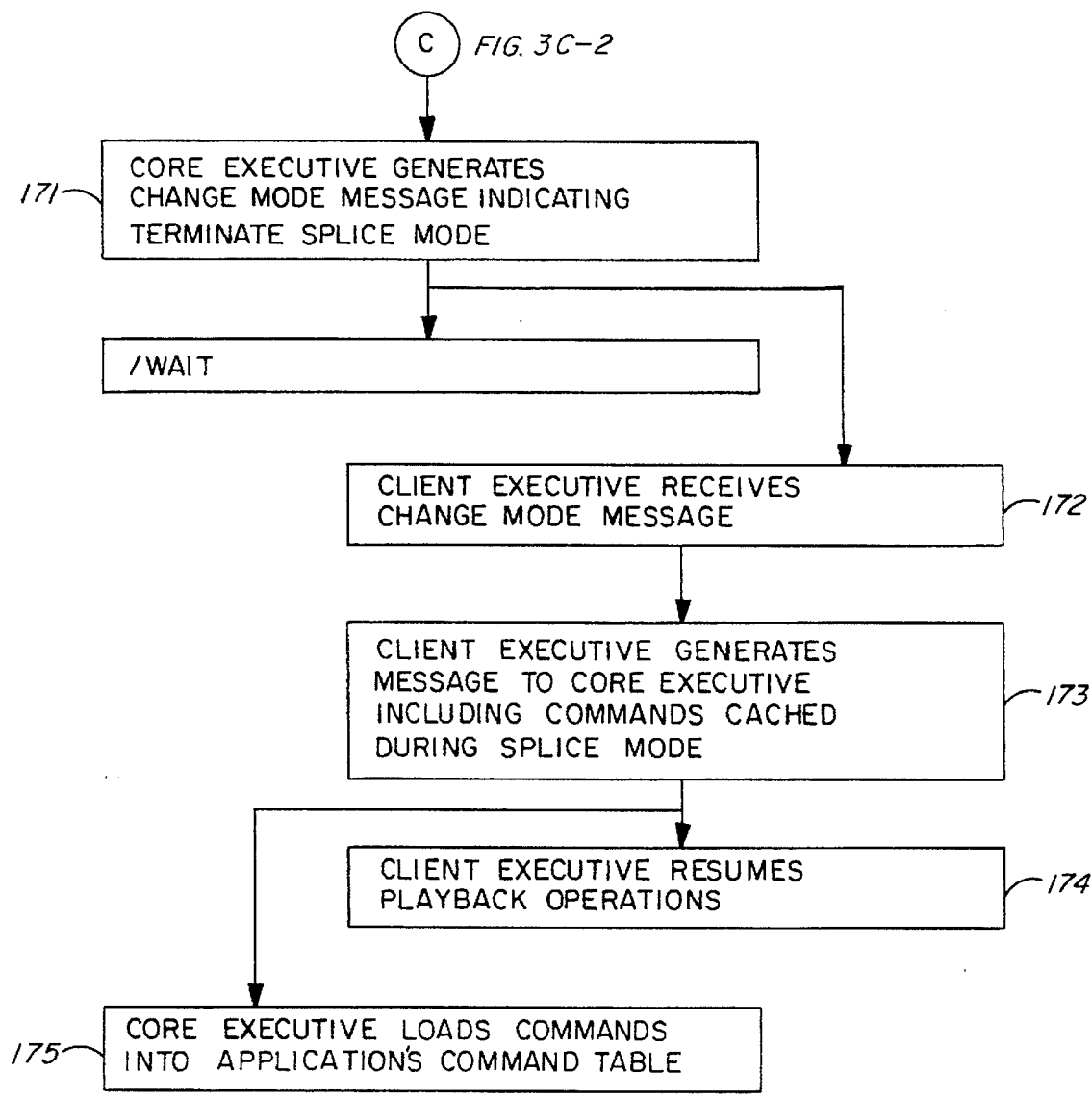
Figure 4:
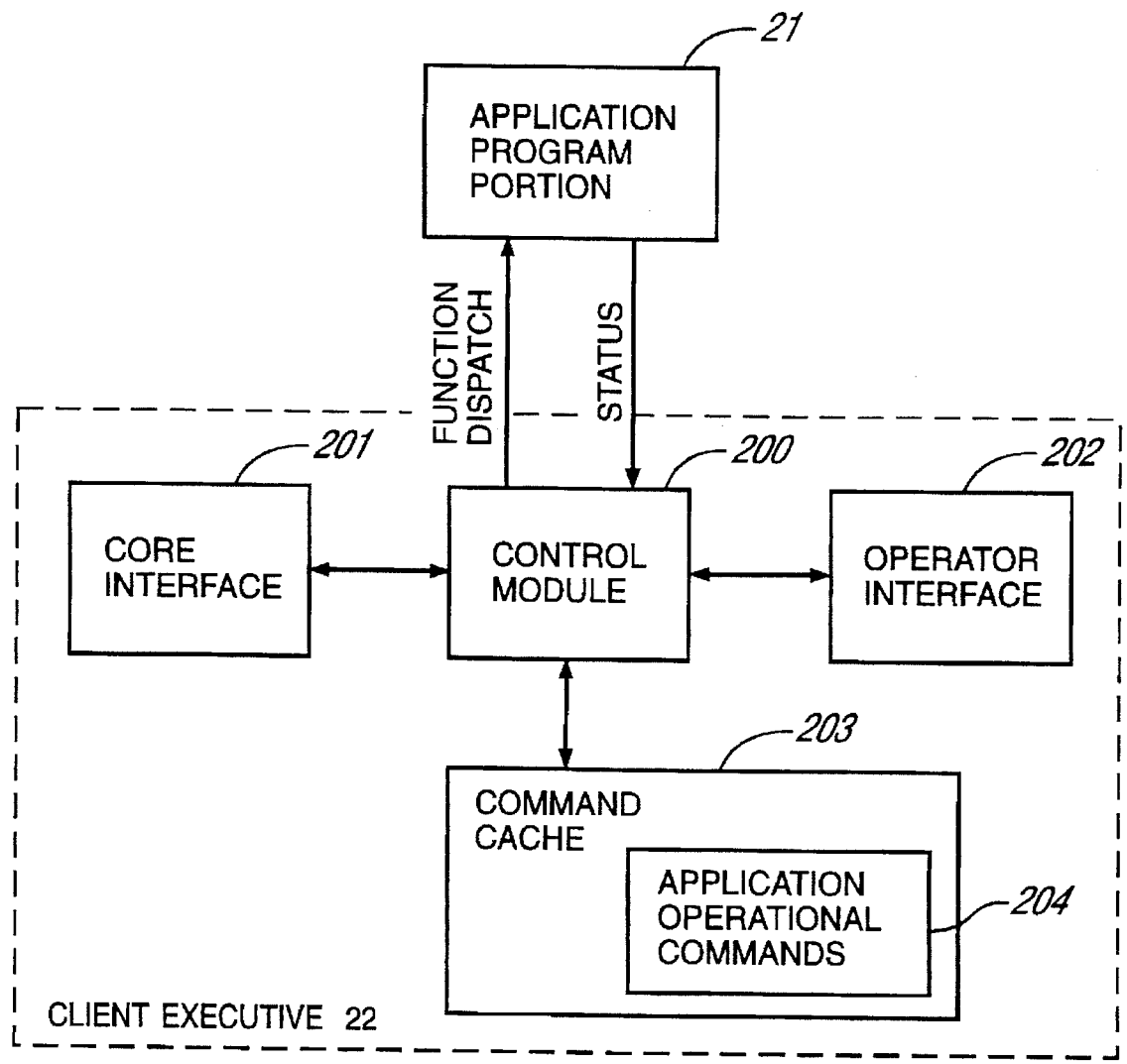

As noted above (following step 137), during the playback mode the core executive 10 may enable the client executive to change modes to a step mode or to a splice mode, which are depicted in FIGS. 3C-1 through 3C-3. In the step mode, the client executive 22 issues commands one by one when enabled by the core executive, and in the splice mode, the client executive 22 temporarily stops issuing commands to the application program portion 21 and begins recording commands issued by an operator through the user interface 20. With reference to FIG. 3C-1, the core executive 10 initially receives a indication to change modes from an operator through the core user interface 11 (step 160). If the new mode is the step mode, the core executive 10 sequences to step 161, in which it generates a change mode message, identifying the step mode, which it transmits to the client executive 22. In response, the client executive 22 pauses issuing commands to the application program portion (step 162).

Thereafter, the core executive 10 iteratively receives step indications from the operator through the core user interface. Upon receipt of a step indication (step 163), the core executive generates a step message for transfer to the client executive 22 (step 164), which, in turn, enables the application program to execute the next command (step 165). The core executive 10 may enable the client executive 22 to return to the playback mode, or to another mode, by transmitting to it a message, similar to that transmitted in step 161, identifying the mode. If the new mode is the playback mode, the client executive resumes automatically issuing commands as described above in connection with FIGS. 3B-1 through 3B-4.

If the core executive determines, in step 160 (FIG. 3C-1), that the new mode is the splice mode, it sequences to step 166 (FIG. 3C-2), in which it generates a change mode message, identifying the splice mode, which it transmits to the client executive 22. In response, the client executive 22 begins caching commands, in the same manner as described above in connection with FIGS. 3A-1 through 3A-3, which the operator enters through the application's user interface 22. When the core executive 10 thereafter receives an indication from the operator, through the core user interface 11, to terminate splice mode, it generates a change mode message therefor (step 171) which it transmits to the client executive 22. The client executive receives the message (step 172) and, in response, generates a message to the core executive 10 including the commands that it cached during the splice mode, and resumes the playback operations in step 174 (FIGS. 3B-1 through 3B-4). Upon receipt of the commands, the core executive 10 stores them in the application's command table 70 and adjusts the global sequence identifications, in that table 70 and others as necessary, to accommodate the new commands.

FIG. 4 depicts a functional block diagram of an application 12 useful in the application integration system (FIG. 1B). As noted above in connection with FIG. 1B, the application 12 includes a client executive 22 and an application program portion 21. With reference to FIG. 4, the client executive 22 includes a control module 200, a core interface 201, an operator interface 202, and a command cache 203. The control module 200 effectively controls operations within the application 12. It transmits messages to, and receives messages from, the core executive 10 through a core interface 201. In addition, the control module 200 receives commands and data from the application's user interface 20 through an operator interface 202, and transmits data and status information to the user interface 20 through the operator interface 202. During a recording session, the control module 200 caches the commands 204 received from the operator interface 202 in the command cache 203 and, as described above, transmits them to the core executive 10 on termination of the application or earlier when requested by the core executive 10. During a playback session, the control module 200 stores the commands to be issued to the application program portion 21 which it receives from the core executive 10. The control module 200 effectively issues commands to the application program portion 21 by means of function dispatches through a callback mechanism. In response to each command, the applications program portion may issue status or other results.

It will be appreciated that, some applications 12 may enable the operator to establish a macro for one or more commands that may be executed by the application 12. Each macro has a name comprising a series of characters, and, when the operator, through the input module 11, enters a series of characters representing the name of the macro, the application 12 processes the series of commands previously defined for the macro. It will be appreciated that the application 12, during the recording session, may transmit either the macro name or the identification of the series of commands defined for the macro in one or more record function message to the core executive 10 for recording in the script, but not both. If the application 12 transmits the macro name to the core executive 10, the core executive 10 records that in the script 13 during the recording session. During a subsequent playback session, the core executive 10 will transmit the macro name, in an execute callback function message, to the application 12 for processing. Upon receipt of the execute callback function message, the application 12 executes the commands defined for the macro.

If, on the other hand, the application 12 transmits the series of commands defined by the macro for recording by the core executive 10, it does so in a series of record function messages, in the sequence defined by the macro, which the core executive 10 records in the script 13. During a subsequent playback session, the core executive 10 will transmit the series of commands, in an execute callback function message as described above, to the application 12 for processing. Upon receipt of the execute callback function messages, the application 12 executes the commands as described above, effectively executing the commands defined for the macro.

It will be appreciated that, if the sequence of commands defined for a macro is in any complex, that is, if it includes looping, branching or conditional commands, or other commands that enable sequencing other than sequentially through the commands transferred in the record function message, the application 12 generally transfers the macro name in the record function message.

It will be appreciated that the various portions described above may all comprise special-purpose apparatus, or they may comprise computer programs executed by a general purpose computer.

The foregoing description has been limited to a specific embodiment of this invention. It will be apparent, however, that variations and modifications may be made to the invention, with the attainment of some or all of the advantages of the invention. Therefore, it is the object of the appended claims to cover all such variations and modifications as come within the true spirit and scope of the invention.

What is claimed as new and desired to be secured by Letters Patent of the United States is:

1. A method of operating a digital computer comprising the steps of:

a) executing application programs, at least two of the application programs being executed concurrently, and while executing each application program, recording for said each application program operational commands which control execution of said each application program and are received from an operator, and recording in association with each operational command a time stamp indicating when said each operational command was received from the operator, and determining from the time stamps a global sequence in which the operator issued the operational commands to the application programs; and b) re-executing the application programs, and controlling the re-execution of the application programs by issuing said each operational command recorded for said each application program to said each application program, the recorded operational commands being issued to the application programs in the determined global sequence in which the operator issued the operational commands to the application programs.

2. The method as claimed in claim 1, wherein the operational commands for said each application program are recorded in a respective command cache for said each application program, and wherein the recorded operational commands are issued to the application programs by:

(i) when the command cache for said each application program includes an operational command in a first position in said global sequence, executing said each application program under control of said operational command in said first position in said global sequence;

(ii) after executing said each application program under control of one of said operational commands from said command cache for said each application program, checking whether said command cache for said each application program includes an operational command that is a next operational command following said one of said operational commands in said global sequence, and when said command cache for said each application program includes an operational command that is a next operational command following said one of said operational commands in said global sequence, executing said each application program under control of said next operational command following said one of said operational commands in said global sequence, and when said command cache for said each application program does not include an operational command that is said next operational command following said one of said operational commands in said global sequence, sending a synchronization message to another one of said application programs having in its command cache said next operational command following said one of said operational commands in said global sequence; and (iii) when said synchronization message is received by said another one of said application programs, executing said another one of said application programs under control of said next operational command following said one of said operational commands in said global sequence.

3. A method of operating a digital computer comprising the steps of:

a) executing application programs, at least two of the application programs being executed concurrently, and while executing each application program, recording operational commands which control execution of said each application program and are received from an operator; and then b) re-executing each application program, and controlling the re-execution of said each application program according to the operational commands recorded for said each application program during the execution of said each application program;

wherein said step a) includes recording the operational commands for said each application program in a respective command cache for said each application program, recording time stamps in said command cache for said each application program, said time stamps including a time stamp for each of said operational commands for said each application program, said time stamp for said each of said operational commands indicating a time at which said each of said operational commands was received from said operator, transferring said operational commands for said each application program from said command cache for said each application program to a script memory, and determining from said time stamps a global sequence in which the operator issued the operational commands to the application programs, and wherein said step b) includes issuing each operational command recorded for said each application program to said each application program, the recorded operational commands being issued to the application programs in the determined global sequence in which the operator issued the operational commands to the application programs.

4. The method as claimed in claim 3, wherein said determining from said time stamps a global sequence in which the operator issued the operational commands to the application programs includes determining for said each operational command a respective sequence identifier identifying a respective position of said each operational command in said global sequence, and wherein said method further includes storing the respective sequence identifier in said script memory in association with said each operational command.

5. The method as claimed in claim 4, wherein the recorded operational commands are issued to the application programs by:

(i) when the command cache for said each application program includes an operational command having a sequence identifier identifying a first position in said global sequence, executing said each application program under control of said operational command having a sequence identifier identifying said first position in said global sequence;

(ii) after executing said each application program under control of one of said operational commands from said command cache for said each application program, checking whether said command cache for said each application program includes an operational command having a sequence identifier identifying a next operational command following said one of said operational commands in said global sequence, and when said command cache for said each application program includes an operational command having a sequence identifier identifying said next operational command following said one of said operational commands in said global sequence, executing said each application program under control of said next operational command following said one of said operational commands in said global sequence, and when said command cache for said each application program does not include said next operational command following said one of said operational commands in said global sequence, sending a synchronization message to another one of said application programs having in its command cache said next operational command following said one of said operational commands in said global sequence; and (iii) when said synchronization message is received by said another one of said application programs, executing said another one of said application programs under control of said next operational command following said one of said operational commands in said global sequence.

6. A method of operating a digital computer in accordance with recorded operational commands, each of said operational commands controlling execution of a respective application program, said recorded operational commands each having an associated sequence identifier identifying each command as having a respective position in a predefined sequence of command execution beginning with a first position, the operational commands for each application program being stored in a respective command cache for said each application program, said method comprising the steps of:

a) executing said each application program by:
  (i) when the command cache for said each application program includes the operational command having a sequence identifier identifying said first position in said predefined sequence, executing said each application program under control of said operational command having a sequence identifier identifying said first position in said predefined sequence;
  (ii) after executing said each application program under control of one of said operational commands from said command cache for said each application program, checking whether said command cache for said each application program includes an operational command having a sequence identifier identifying a next operational command following said one of said operational commands in said predefined sequence, and when said command cache for said each application program includes an operational command having a sequence identifier identifying said next operational command following said one of said operational commands in said predefined sequence, executing said each application program under control of said next operational command following said one of said operational commands in said predefined sequence, and when said command cache for said each application program does not include said next operational command following said one of said operational commands in said predefined sequence, sending a synchronization message to another one of said application programs having in its cache said next operational command following said one of said operational commands in said predefined sequence, and (b) when said synchronization message is received by said another one of said application programs, executing said another one of said application programs under control of said next operational command following said one of said operational commands in said predefined sequence.

\* \* \* \* \*